(12) United States Patent
Arai

(10) Patent No.: US 10,181,622 B2
(45) Date of Patent: Jan. 15, 2019

(54) CELL SYSTEM

(71) Applicant: TOYOTA JIDOSHA KABUSHIKI KAISHA, Toyota-shi, Aichi (JP)

(72) Inventor: Takuichi Arai, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 57 days.

(21) Appl. No.: 15/030,204

(22) PCT Filed: Oct. 21, 2013

(86) PCT No.: PCT/JP2013/078466
§ 371 (c)(1),
(2) Date: Apr. 18, 2016

(87) PCT Pub. No.: WO2015/059746
PCT Pub. Date: Apr. 30, 2015

(65) Prior Publication Data
US 2016/0268651 A1    Sep. 15, 2016

(51) Int. Cl.
*H01M 10/00* (2006.01)
*H01M 10/48* (2006.01)
*H01M 10/42* (2006.01)
*H01M 10/44* (2006.01)
*H02J 7/00* (2006.01)
*H01M 10/0525* (2010.01)

(52) U.S. Cl.
CPC ....... *H01M 10/48* (2013.01); *H01M 10/4257* (2013.01); *H01M 10/441* (2013.01); *H01M 10/482* (2013.01); *H02J 7/0021* (2013.01); *H02J 7/0026* (2013.01); *H02J 7/0047* (2013.01); *H01M 10/0525* (2013.01); *H01M 2010/4271* (2013.01); *H01M 2010/4278* (2013.01); *H01M 2220/20* (2013.01); *H02J 7/0011* (2013.01); *H02J 2007/005* (2013.01); *Y02E 60/122* (2013.01); *Y02T 10/7055* (2013.01)

(58) Field of Classification Search
CPC .......... H01M 10/482; H01M 2220/20; H01M 10/48; H01M 10/441; H01M 10/4257; H01M 10/0525; H01M 2010/4278; H01M 2010/4271; H02J 7/0021; H02J 7/001
See application file for complete search history.

(56) References Cited

U.S. PATENT DOCUMENTS

2004/0001996 A1   1/2004 Sugimoto
2006/0216600 A1   9/2006 Inagaki et al.
(Continued)

FOREIGN PATENT DOCUMENTS

CN   101882689 A  * 11/2010   ............ H01M 10/00
JP   9-180768 A      7/1997
(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

A proposed cell system 100 has a simple second cell unit 20 (for instance, a unit cell (second cell 21)) electrically connected in series to a first cell unit 10 (battery pack) that constitutes a main power source. The state of charge (SOC) of the first cell unit 10 is detected on the basis of a mixed voltage (V3) of first cells 11 included in the first cell unit 10 and the second cell 21.

17 Claims, 12 Drawing Sheets

(56) References Cited

U.S. PATENT DOCUMENTS

| | | | |
|---|---|---|---|
| 2007/0166607 A1 | 7/2007 | Okada et al. | |
| 2010/0300601 A1* | 12/2010 | Nakanishi | H01M 2/1077 156/64 |
| 2011/0031048 A1* | 2/2011 | Ohkura | G01R 31/3658 180/65.1 |
| 2011/0204850 A1 | 8/2011 | Kaino | |
| 2013/0022843 A1 | 1/2013 | Tohda | |
| 2013/0038270 A1* | 2/2013 | Endo | H02J 7/0019 320/103 |
| 2013/0266859 A1* | 10/2013 | Todoriki | H01M 4/625 429/211 |
| 2013/0335030 A1 | 12/2013 | Joe et al. | |
| 2015/0008885 A1 | 1/2015 | Yoshida | |

FOREIGN PATENT DOCUMENTS

| | | |
|---|---|---|
| JP | 2002-298933 A | 10/2002 |
| JP | 2003-75517 A | 3/2003 |
| JP | 2004-31120 A | 1/2004 |
| JP | 2007087909 A | 4/2007 |
| JP | 2007-220658 A | 8/2007 |
| JP | 2008-21589 A | 1/2008 |
| JP | 2009259607 A | 11/2009 |
| JP | 2011-150876 A | 8/2011 |
| JP | 2011-176941 A | 9/2011 |
| JP | 2013089523 A | 5/2013 |
| WO | 2013128807 A1 | 9/2013 |
| WO | 2013/154272 A1 | 10/2013 |

* cited by examiner

CELL SYSTEM

CROSS REFERENCE TO RELATED APPLICATIONS

This application is a National Stage of International Application No. PCT/JP2013/078466 filed Oct. 21, 2013, the contents of which are incorporated herein by reference in their entirety.

TECHNICAL FIELD

The present invention relates to a cell system.

BACKGROUND ART

Methods for detecting the state of charge (SOC) of battery packs in cell systems include, for instance, those proposed in Japanese Patent Application Publication Nos. 2007-220658 and 2011-150876.

Japanese Patent Application Publication No. 2007-220658 discloses a battery pack having a plurality of non-aqueous secondary batteries A as a main constituent, and in which at least one storage element B having a nonaqueous electrolyte for voltage detection is connected in series to the plurality of non-aqueous secondary batteries A. Batteries exhibiting a small change in voltage with respect to the range of SOC in which the battery is mainly used are utilized herein as the non-aqueous secondary batteries A that are the main constituent of the battery pack. By contrast, a battery exhibiting a large change in voltage with respect to the range of SOC in which the battery is mainly used is utilized herein as the storage element B for voltage detection. Japanese Patent Application Publication No. 2007-220658 proposes the feature of detecting the SOC of the battery pack of the non-aqueous secondary batteries A depending on the change in voltage of the non-storage element B.

Japanese Patent Application Publication No. 2011-150876 discloses a battery pack in which a discharge curve of first unit cells exhibits a substantially flat characteristic and the discharge curve of second unit cells exhibits a sloping characteristic, and wherein the SOC or DOD (depth of discharge) of the battery pack is detected on the basis of the terminal voltage of the second unit cells.

Thus, PTLs 1 and 2 disclose a configuration of a battery pack that has, as a main constituent, batteries A exhibiting small changes in voltage within a range of SOC set beforehand, and in which a battery B exhibiting a large change in voltage within the above range of SOC is connected in series, for capacity detection, to the battery pack. The above citations disclose the feature of estimating the SOC (state of charge) or DOD (depth of discharge) of the battery pack, having the batteries A as a main constituent, on the basis of the open circuit voltage (terminal voltage) of the battery B. These features can be built, for instance, into a charge and discharge control system for charging and discharging at appropriate timings, through estimation of the SOC of the battery pack.

CITATION LIST

Patent Literature

[PTL 1] Japanese Patent Application Publication No. 2007-220658

[PTL 2] Japanese Patent Application Publication No. 2011-150876

SUMMARY OF INVENTION

Technical Problem

However, the batteries A that are the main constituent of the battery pack and the battery B for capacity detection are inherently different batteries, and therefore exhibit different degradation characteristics. For instance, some batteries that degrade readily during storage degrade readily as well in the usage environment, for example when charged and discharged at a high rate. As a result, in a case where degradation of the battery B for capacity detection has progressed further than in the batteries A, the open circuit voltage (terminal voltage) of the battery B deviates gradually from the initial state, even for a same SOC of the battery pack. When the open circuit voltage (terminal voltage) of the battery B deviates in this case from the initial state, the state of charge (SOC) of the battery pack may be estimated as being smaller or larger than the actual one.

In this case the battery pack may become overcharged beyond a target value if the state of charge (SOC) of the battery pack is estimated as being smaller than it actually is. In a case where, by contrast, the state of charge (SOC) of the battery pack is estimated as being larger than it actually is, charging may be stopped for a SOC smaller than the target value. Therefore, in a case where the state of charge (SOC) of the battery pack is not detected accurately, charging of the battery pack may be continued even though there is actually no margin any longer with respect to the capacity of the battery pack, or, alternatively, charging of the battery pack may be stopped although there is actually a sufficient margin with respect to the capacity of the battery pack.

Solution to Problem

The cell system proposed herein includes: a chargeable and dischargeable first cell unit; a chargeable and dischargeable second cell unit; and a mixed voltage detection device. The first cell unit comprises a plurality of first cells connected in series. The second cell unit includes at least a second cell connected in series to the first cell unit. In the second cell, a change in open circuit voltage with respect to SOC (%), in a range from SOC 20% to SOC 80%, is larger than that in the first cell. The mixed voltage detection device detects a mixed voltage resulting from combining the open circuit voltage of at least one first cell from among the first cells included in the first cell unit, and the open circuit voltage of at least one second cell from among the second cells included in the second cell unit. Such a cell system allows estimating more accurately the SOC of the first cell unit.

In the first cells, for instance, a proportion of the change in open circuit voltage with respect to SOC (%), in the range from SOC 20% to SOC 80%, is 10 mV/10% or lower. In the second cell, for instance, a proportion of the change in open circuit voltage with respect to SOC (%), in the range from SOC 20% to SOC 80%, is 50 mV/10% or higher.

In the first cells, a proportion of the change of open circuit voltage with respect to SOC (%) may be 100 mV/10% or higher, within a range higher than SOC 95%. In this case, the mixed voltage becomes higher as the SOC of the first cell unit 10 increases. For instance overcharging of the first cell unit during charging can be detected as a result, before it occurs, on the basis of the mixed voltage.

A capacity estimation device may be provided that works out an estimated value of capacity of the first cells or the first cell unit on the basis the mixed voltage detected by the mixed voltage detection device. This allows estimating the state of charge of the first cell unit 10.

The capacity estimation device may be provided for instance with a first map in which a correlation relationship, serving as a reference, between the mixed voltage and the capacity of the first cells or the first cell unit is stored beforehand; and with a computing unit that works out an estimated value of the capacity of the first cells or the first cell unit on the basis of the mixed voltage detected by the mixed voltage detection device and the first map.

The mixed voltage detection device may detect a mixed voltage resulting from combining the open circuit voltage of a cell in which degradation has progressed most, from among the first cells included in the first cell unit, and the open circuit voltage of at least one second cell from among second cells included in the second cell unit.

The mixed voltage detection device may detect a mixed voltage resulting from adding the open circuit voltage of the cell of highest open circuit voltage, from among the first cells included in the first cell unit, and the open circuit voltage of at least one second cell from among second cells included in the second cell unit. In this case, there may be provided a first voltage detection unit that detects respective open circuit voltages of the plurality of first cells included in the first cell unit.

In this case, for instance, the mixed voltage detection device may identify the cell of highest open circuit voltage from among the first cells included in the first cell unit, on the basis of the respective open circuit voltages of the plurality of first cells included in the first cell unit which have been detected by the first voltage detection unit.

The first cell unit may be provided with a restraining member that restrains the first cells included in the first cell unit, such that the second cell is released from the restraint of the restraining member that restrains the first cells.

The cell system may be provided with a second cell degradation detection unit that detects degradation of the second cell.

In this case, for instance, the cell system may be provided with a second voltage detection unit that detects the open circuit voltage of the second cell. In this case, the second cell degradation detection unit may be provided with a second map (V3$i$-V2$i$) in which a correlation relationship, serving as a reference, between the mixed voltage and the open circuit voltage of the second cell is stored beforehand. The second cell degradation detection unit may be provided with a determination unit which, on the basis of the mixed voltage (V3) detected by the mixed voltage detection device and the second map (V3$i$-V2$i$), works out a reference open circuit voltage (V2$i$) of the second cell serving as a reference, and determines whether the open circuit voltage (V2) of the second cell detected by the second voltage detection unit lies within a range established beforehand with reference to the reference open circuit voltage (V2$i$) of the second cell.

The second cell degradation detection unit may be provided with a determination unit that determines the extent of degradation of the second cell on the basis of a rate of change ($\Delta$V3/$\Delta$SOC) in a relationship between the mixed voltage (V3) detected by the mixed voltage detection device and the SOC of the first cell unit.

The first cells may be lithium ion secondary batteries in which positive electrode active material particles having an olivine structure or spinel structure are used as a positive electrode active material, and the second cell may be a lithium ion secondary battery in which positive electrode active material particles having a layered rock salt structure are used as a positive electrode active material.

DESCRIPTION OF EMBODIMENTS

Figure 1:
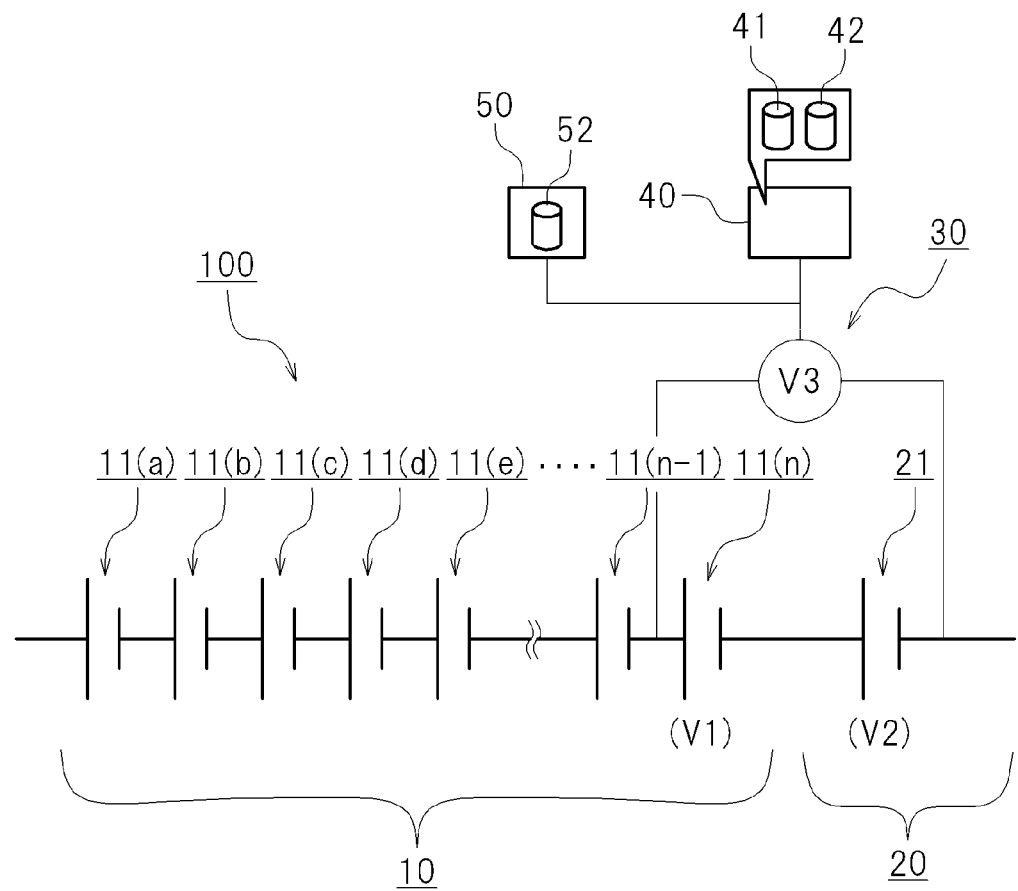
FIG. 1 is a diagram illustrating schematically a cell system.

A cell system according to an embodiment of the present invention will be explained next. Needless to say, the embodiments explained herein are not meant to limit the present invention in any particular way. The dimensional relationships (length, width, thickness and so forth) in the drawings do not reflect actual dimensional relationships. Further, members and portions that elicit identical effects are denoted with identical reference symbols, and a recurrent explanation thereof will be omitted or simplified.

The batteries used in the cell system include secondary batteries. The term "secondary battery" in the present description denotes generally a storage device that can be charged repeatedly, and encompasses so-called storage batteries such as lithium ion secondary batteries, nickel hydride batteries, nickel cadmium batteries and the like, and also storage elements such as electric double-layer capacitors and the like.

The term "lithium ion secondary battery" in the present description denotes a secondary battery in which lithium ions are used as electrolyte ions, and charge and discharge are realized through movement of charge associated with lithium ions, across positive and negative electrodes. Generally, batteries referred to as "lithium secondary batteries" are typical examples of the lithium ion secondary batteries in the present description.

Cell System 100

FIG. 1 is a diagram illustrating schematically a cell system. As illustrated in FIG. 1, the cell system 100 is provided with a chargeable and dischargeable first cell unit 10, a chargeable and dischargeable second cell unit 20, a mixed voltage detection device 30 and a capacity estimation device 40.

First Cell Unit 10

The first cell unit 10 comprises a plurality of first cells connected in series. In the example illustrated in FIG. 1 a plurality of first cells 11(a) to 11(n) is connected in series. The first cells included in the first cell unit 10 are distinguished from each other with a suffixed letter, i.e. first cells 11(a) to 11(n). In cases where the first cells 11(a) to 11(n) included in the first cell unit 10 need not be distinguished, the foregoing will be referred to collectively as "first cells 11", as appropriate. In cases where the respective open circuit voltages of the first cells 11(a) to 11(n) included in the first cell unit 10 need to be distinguished, the open circuit voltage will be suffixed with a respective letter, i.e. "open circuit voltage (V1a)" to "open circuit voltage (V1n)". In cases where the open circuit voltages of the first cells 11(a) to 11(n) included in the first cell unit 10 requires no distinction, the open circuit voltage will be referred to as "open circuit voltage (V1)".

Second Cell Unit 20

The second cell unit 20 comprises at least one second cell 21 connected in series to the first cell unit 10. It suffices that the second cell unit 20 comprises at least one second cell 21, but the second cell unit 20 may be provided with a plurality of second cells 21. In the example illustrated in FIG. 1 there is one second cell included in the second cell unit 20. In the example illustrated in FIG. 1 the second cell 21 included in the second cell unit 20 has one end connected in series to the first cell 11(n) from among the first cells 11(a) to 11(n) included in the first cell unit 10. The open circuit voltage of the second cell 21 will be appropriately referred to as "open circuit voltage (V2)".

Mixed Voltage Detection Device 30

The mixed voltage detection device 30 detects a mixed voltage (V3) resulting from combining the open circuit voltage (V1) of the first cells 11 and the open circuit voltage (V2) of the second cell 21. In the example illustrated in FIG. 1 the first cell 11(n) and the second cell 21 are electrically connected in series. The mixed voltage detection device 30 detects voltage across terminals on both sides at which the first cell 11(n) and the second cell 21 are not connected in series. The mixed voltage (V3) that is detected by the mixed voltage detection device 30 is voltage (V1n+V2), resulting from summating the open circuit voltage (V1n) of the first cell 11(n) and the open circuit voltage (V2) of the second cell 21.

Relationship Between SOC and Open Circuit Voltage

Figure 2:
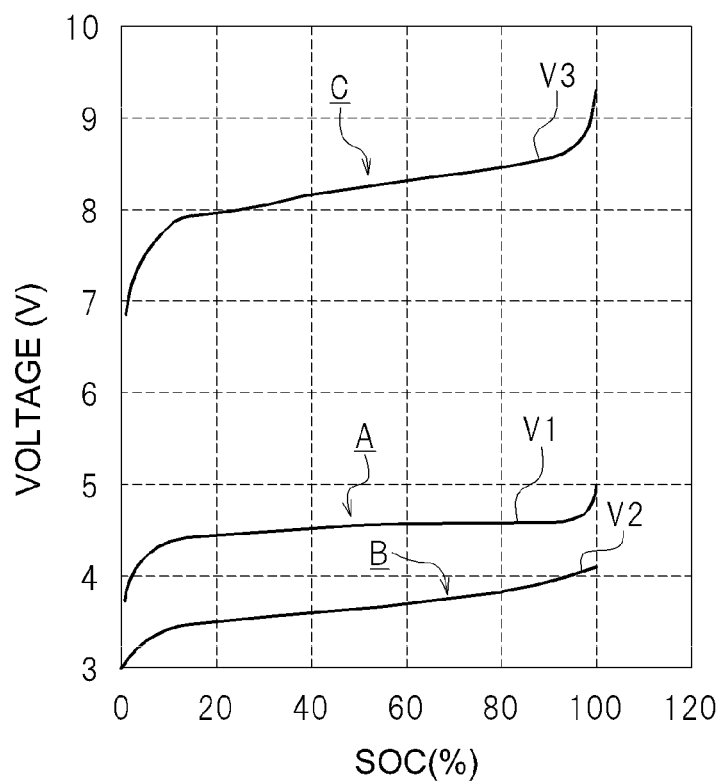
FIG. 2 illustrates the SOC, open circuit voltage and mixed voltage of first cells included in a first cell unit and of a second cell included in a second cell unit.

FIG. 2 illustrates a typical example of a relationship between SOC and open circuit voltage for the first cells 11 (herein, unit cells) included in the first cell unit 10 and the second cell 21 (herein, a unit cell) included in the second cell unit 20, in the cell system 100.

Definition of SOC

The horizontal axis (SOC) in FIG. 2 can be grasped as the quantity of electricity with which there is charged the battery that is to be measured. Herein, the term "SOC" denotes the state of charge of a battery. The term "SOC" may be referred to as a relative value of the quantity of electricity, as the proportion of the quantity of electricity with which the battery is charged, taking 100 as the quantity of electricity with which the battery is charged at SOC 100%. Setting thus to 100 the quantity of electricity with which the battery at SOC 100% is charged, then an instance where the quantity of electricity with which the battery is charged corresponds to 80 is referred to as a SOC 80%, and an instance where the quantity of electricity with which the battery is charged corresponds to 60 is referred to as SOC 60%. That is, the "SOC" is an index for evaluating relatively the quantity of electricity with which a battery is charged is taking 100 as the quantity of electricity with which the battery is charged at SOC 100%". The "quantity of electricity with which a battery is charged at SOC 100%" can be worked out for instance on the basis of rated capacity.

In FIG. 2, the first cell unit 10 and the second cell unit 20 connected in series are charged at increments of quantity of electricity established beforehand, from a sufficiently discharged state. The open circuit voltage (V1) of the first cells 11, the open circuit voltage (V2) of the second cell 21 and the mixed voltage (V3) are measured at each increment. For instance, charging is performed through constant-current charging of a quantity of electricity corresponding to 1 C for the rated capacity of the battery that is to be measured. The charged quantity of electricity can be grasped herein on the basis of the current value at the time of charging and the charging time, since charging is carried out at constant current. The open circuit voltage (V1) of the first cell unit 10, the open circuit voltage (V2) of the second cell unit 20 and the mixed voltage (V3) are measured every time that a quantity of electricity corresponding to 1 C is charged. For instance, the open circuit voltage may be measured after waiting for about 10 seconds until the open circuit voltage of the cells is stabilized, upon every charging.

The horizontal axis in FIG. 2 is based on the SOC of the first cells 11 included in the first cell unit 10. That is, the measured open circuit voltage (V1) of the first cells 11, the open circuit voltage (V2) of the second cell 21 and the mixed voltage (V3) are plotted with respect to the SOC of the first cells 11 included in the first cell unit 10.

The solid line (A) in FIG. 2 denotes the relationship between the SOC of the first cells 11 included in the first cell unit 10 and the open circuit voltage (V1). The solid line (B) in FIG. 2 denotes the relationship between the SOC of the first cells 11 included in the first cell unit 10 in an initial state and the open circuit voltage (V2) of the second cell 21. The solid line (C) in FIG. 2 denotes the relationship between the SOC of the first cells 11 included in the first cell unit 10 in the initial state and the mixed voltage (V3).

Hereafter, the relationship between the SOC of the first cells 11 included in the first cell unit 10 and the open circuit voltage (V1) will be referred to as "SOC-V1", as appropriate. The relationship between the SOC of the first cells 11 included in the first cell unit 10 and the open circuit voltage (V2) of the second cell 21 will be referred to as "SOC-V2", as appropriate. Further, the relationship between the SOC of the first cells 11 included in the first cell unit 10 and the mixed voltage (V3) will be referred to as "SOC-V3", as appropriate.

First Cells 11

As illustrated in FIG. 2, cells that exhibit small change in the open circuit voltage (V1) with respect to SOC, within a range of SOC 20% to SOC 80%, are used herein as the plurality of first cells 11 included in the first cell unit 10.

Examples of such first cells 11 include, for instance, lithium ion secondary batteries in which positive electrode active material particles having an olivine structure or spinel structure are used as a positive electrode active material. Examples of positive electrode active material particles having an olivine structure include, for instance, $LiFePO_4$.

Examples of positive electrode active material particles having a spinel structure include, for instance, $LiMn_2O_4$.

Lithium ion secondary batteries in which positive electrode active material particles having an olivine structure or a spinel structure are used as a positive electrode active material tend to exhibit small changes in open circuit voltage with respect to SOC (%), within a range of SOC 20% to SOC 80%. In such lithium ion secondary batteries, for instance, the proportion of the change of open circuit voltage (V1) with respect to SOC (%) is 10 mV/10% or lower in a range of SOC 20% to SOC 80%. In other words, the change in open circuit voltage (V1) with respect to the change in SOC 10% is about 10 mV or less. In the first cells 11 included in the first cell unit 10, thus, the change in open circuit voltage (V1) with respect to SOC (%) is small, within a range of SOC 20% to SOC 80%.

In the first cells 11 included in the first cell unit 10 of the present embodiment, the proportion of the change of the open circuit voltage with respect to SOC (%) is equal to or higher than 100 mV/10%, in a range higher than SOC 95%. In the first cells 11 included in the first cell unit 10, thus, the change in the open circuit voltage with respect to SOC (%) is remarkably large in a range higher than SOC 95%. Thus, SOC-V1 for the first cells 11 included in the first cell unit 10 exhibits a graph that is flat, with a small slope, within a range of SOC 20% to SOC 80%, but with the open circuit voltage (V1) rising sharply in a range higher than about SOC 95%. That is, SOC-V1 for the first cells 11 included in the first cell unit 10 exhibits a flat graph, with a small slope, in a range of SOC 20% to SOC 80%.

Second Cell 21

In the second cell 21 included in the second cell unit 20, by contrast, there is used a cell having a larger change in the open circuit voltage (V2) with respect to SOC, within a range of SOC 20% to SOC 80%, as compared with the first cells 11 included in the first cell unit 10. For instance, the proportion of the change of the open circuit voltage (V2) with respect to SOC (%), in the range from SOC 20% to SOC 80%, is 50 mV/10% or higher for the second cell 21. Thus, SOC-V2 for the second cell 21 included in the second cell unit 20 exhibits a graph in which the open circuit voltage (V2) with respect to SOC rises at a substantially constant proportion (in other words, is a sloping graph).

For instance positive electrode active material particles having a layered rock salt structure are used as the positive electrode active material particles in the second cell 21. Examples of positive electrode active material particles having a layered rock salt structure include, for instance, $LiNiCoMnO_2$ (lithium-nickel-cobalt-manganese complex oxide), $LiNiO_2$ (lithium nickelate), $LiCoO_2$ (lithium cobaltate) and the like. A lithium ion secondary battery exhibiting a comparatively large change in open circuit voltage with respect to SOC (%), in the range from SOC 20% to SOC 80%, is obtained as a result.

Capacity Estimation Device 40

In the present embodiment there is provided a capacity estimation device 40 that works out an estimated value of the capacity of the first cell 11(n) or of the first cell unit 10 on the basis of the mixed voltage (V3) that is detected by the mixed voltage detection device 30.

As illustrated in FIG. 1, the capacity estimation device 40 is provided with a first map 41 and a computing unit 42. In the first map 41 there is stored beforehand a correlation relationship, serving as a reference, between the mixed voltage (V3) and the capacity of the first cell 11(n) or of the first cell unit 10. In the first map 41 there may be stored for instance SOC-V3 at an initial state, such as the one denoted by the solid line C in FIG. 2.

The computing unit 42 works out an estimated value of the capacity (SOC) of the first cell 11(n) or of the first cell unit 10 on the basis of the mixed voltage (V3) detected by the mixed voltage detection device 30 and the first map 41 (SOC-V3). Specifically, the capacity estimation device 40 refers to the first map 41 (SOC-V3) stored beforehand on the basis of the mixed voltage (V3) detected by the mixed voltage detection device 30. As a result there is obtained an estimated value of the state of charge (SOC) of the first cell 11(n) or of the first cell unit 10.

Regarding SOC-V3 herein, the mixed voltage (V3) rises gradually with increasing SOC (%), in the range from SOC 20% to SOC 80%, as denoted by the solid line C in FIG. 2. In that range, the slope of SOC-V3 (solid line C) is steeper than the slope of SOC-V2 (solid line B) of the second cell 21. Accordingly, a large error is readily incurred when estimating the SOC of the first cells 11 by referring to SOC-V2 (solid line B), on the basis of the detected open circuit voltage (V2) of the second cell 21. By contrast, the SOC of the first cells 11 can be grasped (estimated) more accurately, in a case where the SOC of the first cells 11 is estimated by referring to SOC-V3 (solid line C) on the basis of the detected mixed voltage (V3). The state of charge (SOC) of the first cell unit 10 as a battery pack can be estimated on the basis of the SOC of the first cells 11.

As denoted by SOC-V3 (solid line C), the mixed voltage (V3) rises sharply in the vicinity of about SOC 95%. The proximity of the SOC of the first cell unit 10 to SOC 100% during charging can be thus detected on the basis of that change. A system, where the SOC of the first cell unit 10 is estimated by referring to SOC-V3 on the basis of the detected mixed voltage (V3), allows reliably detection beforehand that the first cell unit 10 is reaching SOC 100% during charging.

For instance, a sharp change in SOC-V3 (C) may be detected, and the fact that the detected mixed voltage (V3) has become larger than a value established beforehand may likewise be detected, on the basis of the detected mixed voltage (V3). Charging can be reliably stopped, on the basis of such detection, before the first cell unit 10 reaches SOC 100%. As a result, the first cell unit 10 can be charged up to the upper limit of available SOC while being prevented from being overcharged.

By contrast, SOC-V2 (solid line B) in the second cell 21 increases gradually as the SOC becomes larger. Accordingly, the fact that the SOC of the first cell unit 10 is approaching SOC 100% cannot be detected reliably in a case where the SOC of the first cell unit 10 is estimated by referring to SOC-V2 (solid line B) of the second cell 21, on the basis of the detected open circuit voltage (V2) of the second cell 21. That is, SOC-V2 (solid line B) of the second cell 21 does not exhibit a clear change before the first cell unit 10 reaches SOC 100%, and it is not possible to detect that the first cell unit 10 is approaching SOC 100%.

In the cell system 100 proposed herein, the mixed voltage (V3), which is a combination of the open circuit voltage (V1) of the first cells 11 and the open circuit voltage (V2) of the second cell 21, is detected by the mixed voltage detection device 30, as illustrated in FIG. 1. In this case, as described above, the SOC of the first cell unit 10 can be estimated by referring to SOC-V3 (solid line C in FIG. 2) on the basis of the detected mixed voltage (V3), as described above. This method allows estimating the SOC of the first cell unit 10 more accurately, and allows charging the first cell unit 10 up to the upper limit of available SOC, while preventing the first cell unit 10 from overcharging. The performance of the first cell unit 10 can be fully brought out as a result.

In the cell system 100, as illustrated in FIG. 1, there may be provided the capacity estimation device 40 that works out an estimated value of the capacity of the first cells 11 or of the first cell unit 10, on the basis of the mixed voltage detected by the mixed voltage detection device 30. The capacity estimation device 40 may be provided with, for instance, a first map (C) in which there is stored beforehand a correlation relationship (SOC-V3), serving as a reference, between the mixed voltage (V3) and the capacity of the first cells 11 or the first cell unit 10. In this case, the capacity estimation device 40 may be further provided with the computing unit 42 that works out an estimated value of the capacity of the first cells 11 or the first cell unit 10, on the basis of the mixed voltage (V3) detected by the mixed voltage detection device 30 and on the basis of the first map (C).

Various other implementations will be explained next.

Use of a Cell in which Degradation has Progressed Most

As described above, the first cell unit 10 comprises a plurality of first cells. Although the plurality of first cells 11 are identical to one another, these cells exhibit individual differences, and this leads to variability in the degree of degradation among the cells. Accordingly, there has been proposed a method for estimating the SOC of the first cell unit 10 more properly, taking into consideration the variability in the degree of degradation in the first cells 11.

Findings by the inventors reveals that it suffices herein to detect the mixed voltage (V3) of the open circuit voltage (V1) of the cell in which degradation has progressed most, from among the plurality of first cells 11 included in the first cell unit 10, and the open circuit voltage (V2) of the second cell 21 included in the second cell unit 20. As a result, it becomes possible to prevent more reliably overcharging of the first cells 11 included in the first cell unit 10, when controlling charging of the first cell unit 10 while referring to SOC-V3(C) on the basis of the detected mixed voltage (V3). The underlying reasons for this are explored below.

Degradation of a Lithium Ion Secondary Battery

In the negative electrode of a lithium ion secondary battery, lithium ions from an electrolyte solution enter negative electrode active material particles during charging. The lithium ion having entered into the negative electrode active material particles are released from the latter during discharge. In such charge and discharge, compounds are formed by some lithium ions in the electrolyte solution that should have entered the negative electrode active material particles, and a coating film (SEI: solid electrolyte interface) is formed as a result on the surface of the negative electrode active material particles.

When a coating film (SEI) is formed on the surface of the negative electrode active material particles, some of the lithium ions remain in the form of the SEI coating film on the negative electrode active material particles after discharge as well. This SEI coating film is one cause of performance degradation in the lithium ion secondary battery.

Trends Associated with Degradation of the Lithium Ion Secondary Battery

Figure 3:
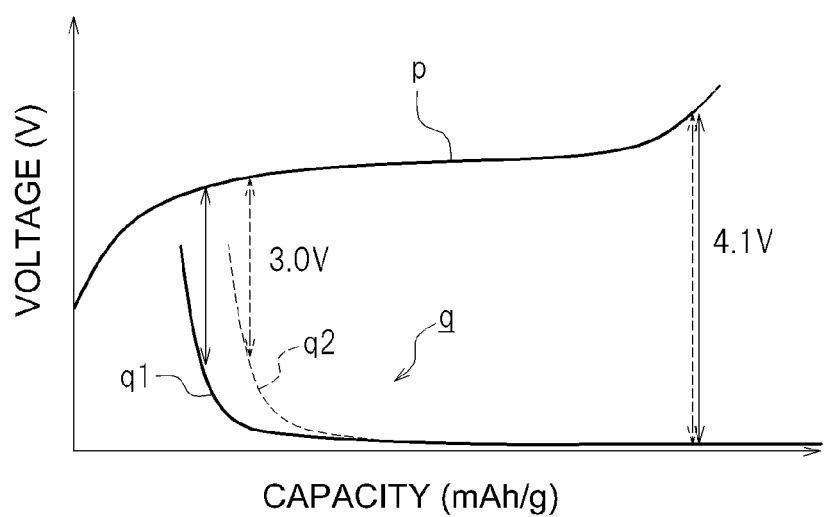
FIG. 3 illustrates a typical relationship between the state of charge (SOC) of a lithium ion secondary battery, and the single-electrode potential (p) of a positive electrode and the single-electrode potential (q) of a negative electrode.
Figure 4:
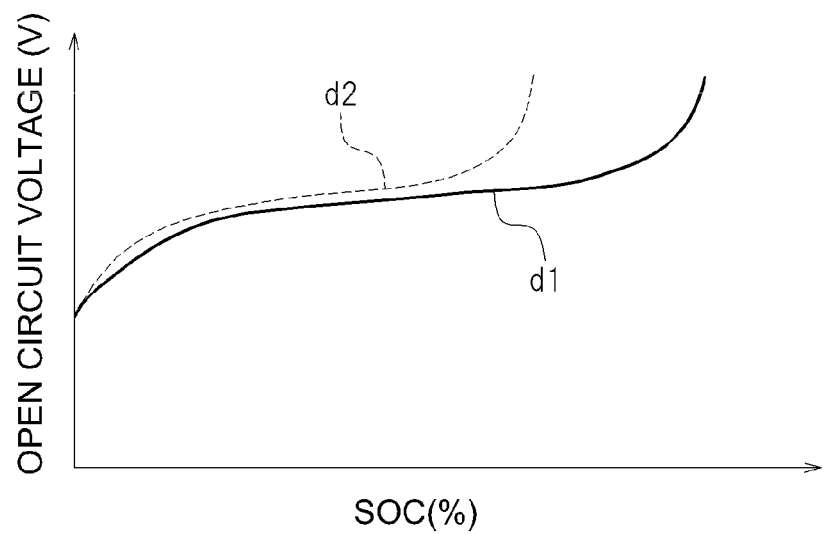
FIG. 4 illustrates a typical relationship between SOC—open circuit voltage (OCV) in a lithium ion secondary battery in which positive electrode active material particles of olivine structure or spinel structure are used in a positive electrode active material.

FIG. 3 and FIG. 4 illustrate trends associated with degradation of a lithium ion secondary battery. FIG. 3 illustrates a typical relationship between the state of charge (SOC) of a lithium ion secondary battery and a single-electrode potential (p) of a positive electrode and the single-electrode potential (q) of a negative electrode. In FIG. 3, the positive electrode potential and the negative electrode potential are evaluated relatively with respect to the potential of metallic lithium, as a reference potential (0 V). In this case, the open circuit voltage of the lithium ion secondary battery is roughly the difference between the single-electrode potential of the positive electrode and the single-electrode potential of the negative electrode. FIG. 4 illustrates a typical relationship (hereafter referred to as "SOC-OCV") between the SOC of a lithium ion secondary battery in which positive electrode active material particles of olivine structure or spinel structure are used in a positive electrode active material, and the open circuit voltage (OCV).

In the single-electrode potential (q) of the negative electrode of the lithium ion secondary battery of FIG. 3, the single-electrode potential of the negative electrode of the lithium ion secondary battery at an initial state is denoted by a solid line (q1), while the single-electrode potential of the negative electrode of the lithium ion secondary battery in a degraded state is denoted by a dotted line (q2). In FIG. 4, SOC-OCV of the lithium ion secondary battery in an initial state is denoted by a solid line (d1), and SOC-OCV in a state where the lithium ion secondary battery has degraded is denoted by a dotted line (d2).

As illustrated in FIG. 3, a state where the open circuit voltage (difference between the single-electrode potential (p) of the positive electrode and the single-electrode potential (q) of the negative electrode) has reached 3.0 V is set as a yardstick of the lower limit of the available SOC of the lithium ion secondary battery. The state in which the open circuit voltage (ditto) has reached 4.1 V is set as a yardstick of the upper limit of the available SOC of the first cell unit 10.

When the lithium ion secondary battery degrades and a coating film (SEI) becomes formed on the surface of the negative electrode active material particles, the single-electrode potential of the negative electrode rises at an early stage, during discharge, as compared with the initial state, as denoted by the dotted line q2 in FIG. 3. As illustrated in FIG. 3, the single-electrode potential curve (q2) of the negative electrode shifts rightward with respect to the single-electrode potential curve (p) of the positive electrode, as compared with the initial state. Accordingly, the potential difference between the positive electrode and the negative electrode decreases early on during discharge. The battery voltage rises early on during charging as well. Accordingly, when the lithium ion secondary battery degrades, the battery voltage with respect to the charged quantity of electricity becomes 4.1 V early on, which results in a drop in battery capacity.

As illustrated in FIG. 4, the relationship SOC-OCV (d2) of the lithium ion secondary battery in which degradation has progressed preserves the form of SOC-OCV (d1) of the initial state, but compressed leftward (towards a lower SOC). A trend is observed as a result, as illustrated in FIG. 4, whereby a lithium ion secondary battery in which degradation has progressed exhibits a higher open circuit voltage (OCV) for a same SOC.

Identification of the Cell in which Degradation has Progressed Most

On the basis of such a trend, the cell for which degradation has progressed most from among the first cells 11 included in the first cell unit 10 is identified by identifying the cell having the highest open circuit voltage (V1). For instance, in a case where, in the first cell unit 10 illustrated in FIG. 1, the open circuit voltage (V1*n*) of the first cell 11(*n*) from among the first cells 11(*a*) to 11(*n*) included in the first cell unit 10 is highest, then the first cell 11(*n*) is the cell in which degradation has progressed most. It suffices herein to work out the mixed voltage (V3) (=V1n+V2) resulting from adding the open circuit voltage (V1n) of the first cell 11(n) and the open circuit voltage (V2) of the second cell 21 included in the second cell unit 20.

The first cells 11(a) to 11(n) included in the first cell unit 10 exhibit a trend whereby the further the degradation of the cell has progressed, the higher the open circuit voltage (V1) is, as illustrated in FIG. 4. Moreover, the further the degradation of the cell has progressed, the sharper is the rise in the open circuit voltage (V1) at a low SOC. That is, the timing at which the open circuit voltage (V1) rises sharply becomes earlier during charging. The timing of sharp rise during charging for the mixed voltage (V3) detected or calculated using the open circuit voltage (V1) of a cell in which degradation has progressed is therefore an early timing. The first cells 11 included in the first cell unit 10 can accordingly be thus prevented from overcharging, more reliably, in a system for controlling charging of the first cell unit 10 by referring to SOC-V3 (C: see FIG. 2) on the basis of the mixed voltage (V3).

First Voltage Detection Units 31(a) to 31(n)

Figure 5:
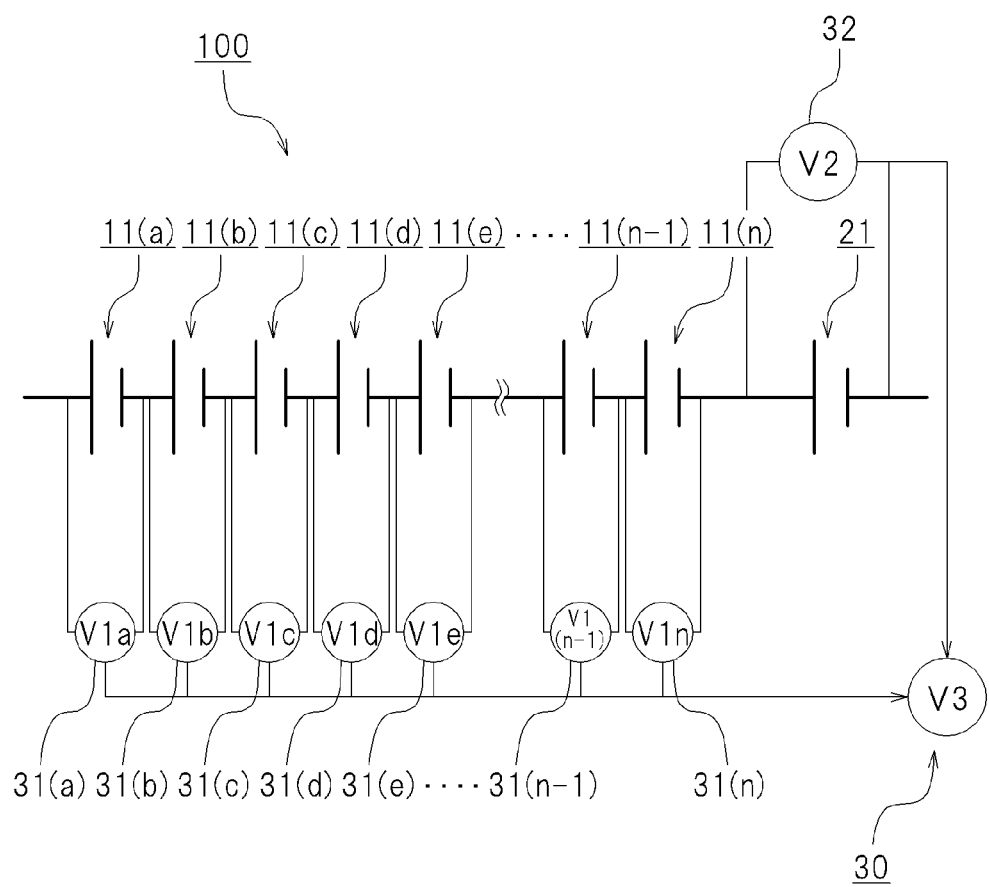
FIG. 5 is a diagram illustrating another form of a cell system.

FIG. 5 illustrates another form of the cell system 100. In this case, for instance, there may be provided first voltage detection units 31(a) to 31(n) that respectively detect the open circuit voltages of the plurality of first cells 11(a) to 11(n) included in the first cell unit 10, as illustrated in FIG. 5. A second voltage detection unit 32 may be further provided that detects the open circuit voltage (V2) of the second cell 21 included in the second cell unit 20.

In a case where, for instance, the open circuit voltage (V1n) of the first cell 11(n) from among the first cells 11(a) to 11(n) is highest, the open circuit voltage (V1n) of the first cell 11(n) may be used to calculate the mixed voltage (V3). Specifically, the mixed voltage (V3) is worked out as a voltage (V1n+V2) resulting from adding the open circuit voltage (V1n) of the battery 11(n) of highest open circuit voltage, and the open circuit voltage (V2) of the second cell 21. In this case, the mixed voltage detection device 30 may be configured for instance in the form of an adder that adds the open circuit voltage (V1n) of the first cell 11(n) and the open circuit voltage (V2) of the second cell 21.

Effect of Identifying the Cell in which Degradation has Progressed Most

The SOC of the first cell unit 10 is estimated by referring to SOC-V3 (C: see FIG. 2) on the basis of mixed voltage (V3) {=(V1n+V2)}; as a result, charging of the first cell unit 10 can be stopped at an appropriate timing.

In this case, as charging approaches full charge, the open circuit voltage (V1n) of the first cell 11(n) rises sharply, and also the mixed voltage (V3) {=(V1n+V2)} as well rises sharply. The other first cells 11(a) to 11(n−1) included in the first cell unit 10 have a lower degree of degradation than the first cell 11(n), and thus the cells should not have reached the upper limit of available SOC. Thus, charging of the other first cells 11(a) to 11(n−1) included in the first cell unit 10 is stopped in a state where there is a slight margin with respect to full charge, in a system for controlling charging of the first cell unit 10 by referring to SOC-V3 (C: see FIG. 2) on the basis of the mixed voltage (V3). The first cells 11(a) to 11(n) of the first cell unit 10 can be thus prevented, more reliably, from exceeding the upper limit of available SOC and from overcharging.

Upon calculation of the mixed voltage (V3), conversely, the mixed voltage (V3) is calculated as low when a battery is selected in which degradation has not progressed much, from among the first cells 11(a) to 11(n) included in the first cell unit 10. In this case, the timing at which charging of the first cell unit 10 is stopped is delayed in the system for controlling charging of the first cell unit 10 by referring to SOC-V3 (C: see FIG. 2) on the basis of the mixed voltage (V3). As a result, charging may in some instances continue beyond the upper limit of available SOC in cells in which degradation has progressed, from among the first cells 11(a) to 11(n) included in the first cell unit 10.

It suffices herein to work out the mixed voltage (V3) {=(V1n+V2)} of the open circuit voltage (V2) of the second cell 21 by identifying the cell (herein, first cell 11(n)) in which degradation has progressed most, from among the first cells 11(a) to 11(n) included in the first cell unit 10. As a result, cells in which degradation has progressed, from among the first cells 11(a) to 11(n) included in the first cell unit 10, can be prevented more reliably from being charged continuously beyond the upper limit of available SOC.

Herein the battery in which degradation has progressed most, from among the first cells 11(a) to 11(n) included in the first cell unit 10, is identified as the first cell 11(n) of highest open circuit voltage. Any other available method for identifying the cell in which degradation has progressed most from among the first cells 11(a) to 11(n) included in the first cell unit 10 may be likewise resorted to herein.

Arrangement of the Second Cell 21

Figure 6:
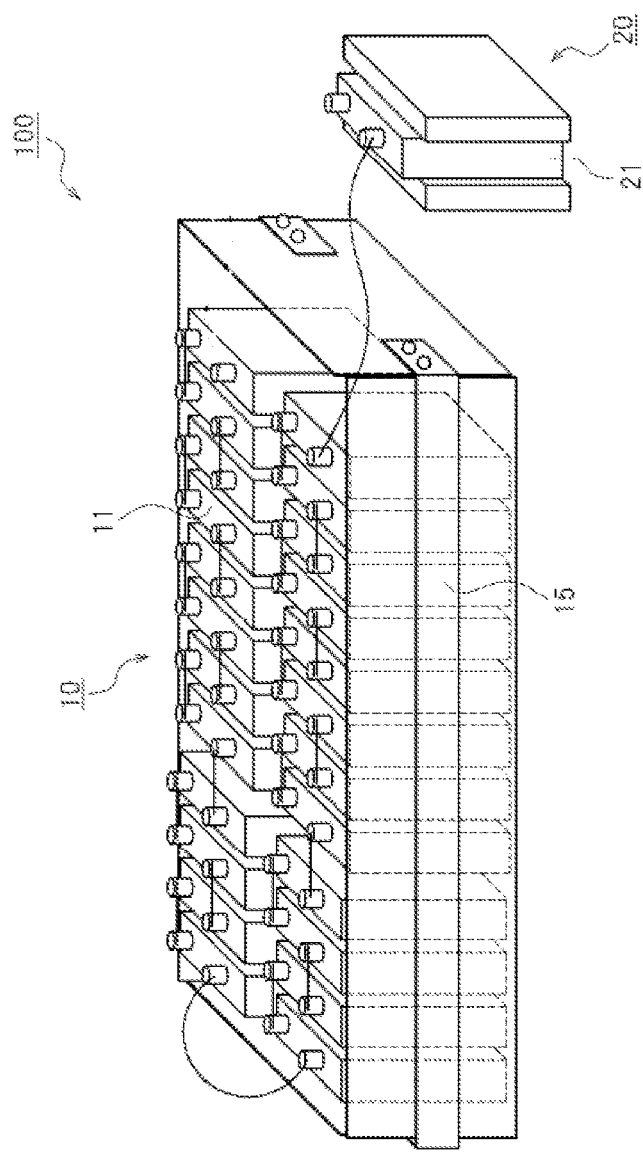
FIG. 6 illustrates a construction example of a first cell unit and a second cell unit.

Other forms will be explained next. FIG. 6 illustrates a construction example of the first cell unit 10 and the second cell unit 20. As illustrated in FIG. 6, in a case where, for instance, a restraining member 15 is provided that restrains the first cells 11 included in the first cell unit 10, the second cell 21 included in the second cell unit 20 may be separate and independent, released from the restraint of the restraining member 15 that restrains the first cells 11. As a result, the second cell 21 can be removed without releasing the restraint of the first cells 11 included in the first cell unit 10. Removal of the second cell 21 alone is easy in this case. Therefore, for instance a cell having a shorter life than that of the first cells 11 can be used as the second cell 21, assuming periodic replacement of the latter. Short-lived batteries include, for instance, dedicated inexpensive batteries or recycled batteries having been already used. The cost of the cell system can be kept low as a result.

Variation Caused by Degradation

The mixed voltage (V3) varies for instance depending on the degradation of the second cell 21. An inexpensive cell may be used as the second cell 21 assuming replacement of the latter. In the cell system 100 described above, the first cell unit 10 is prevented from overcharging even upon degradation of the second cell 21, but the accuracy of estimating the SOC of the first cell unit 10 has to be compromised. Therefore, the second cell 21 is preferably replaced at an appropriate timing before degradation is advanced.

Figure 7:
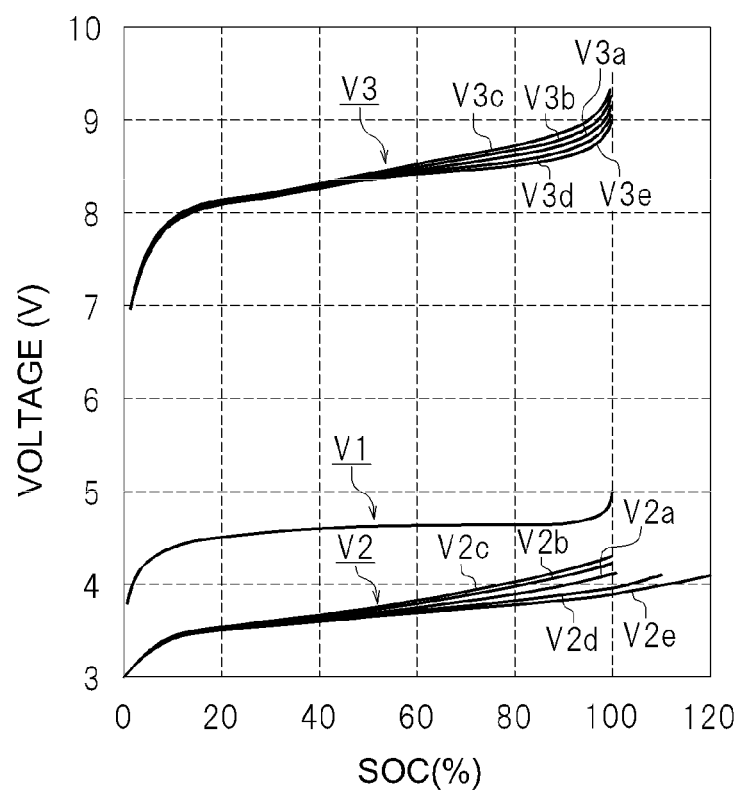
FIG. 7 illustrates the relationship between the SOC of first cells included in a first cell unit, an open circuit voltage (V1) of the first cells, an open circuit voltage (V2) of a second cell, and a mixed voltage (V3)

An explanation follows next on the influence of the degradation of the second cell 21 and the degradation of the first cell unit 10 in the cell system 100 described above. FIG. 7 illustrates a relationship between the SOC of the first cells 11 included in the first cell unit 10, the open circuit voltage (V1) of the first cells 11, the open circuit voltage (V2) of the second cell 21, and the mixed voltage (V3).

The horizontal axis in FIG. 7 is based on the SOC of the first cells 11 included in the first cell unit 10. That is, the measured open circuit voltage (V1) of the first cells 11, the open circuit voltage (V2) of the second cell 21 and the mixed voltage (V3) are plotted with respect to the SOC of the first cells 11 included in the first cell unit 10.

Herein, the reference symbols V2a and V3a denote respectively the detected open circuit voltage (V2) of the second cell 21 and the mixed voltage (V3) in the case of a combination of the first cell unit 10 (first cells 11) and the second cell 21, both in the initial state.

The reference symbols V2b and V3b denote the detected open circuit voltage (V2) of the second cell 21 and the mixed voltage (V3) in the case of a combination of the first cell unit 10 (first cells 11) in the initial state and the second cell 21 having degraded. The reference symbols V2c and V3c denote the detected open circuit voltage (V2) of the second cell 21 and the mixed voltage (V3) in the case of a combination of the first cell unit 10 (first cells 11) in the initial state and the second cell 21 having degraded further.

The reference symbols V2d and V3d denote the detected open circuit voltage (V2) of the second cell 21 and the mixed voltage (V3) in the case of a combination of first cell unit 10 (first cells 11) having degraded and the second cell 21 in the initial state. The reference symbols V2e and V3e denote the detected open circuit voltage (V2) of the second cell 21 and the mixed voltage (V3) in the case of a combination of the first cell unit 10 (first cells 11) having degraded further and the second cell 21 in the initial state.

The plot of the open circuit voltage (V1) of the first cells 11 exhibits virtually no change, since the voltage is referred to the SOC of the first cells 11 included in the first cell unit 10.

Trends in Case of Degradation of the Second Cell 21

In the case of degradation of the second cell 21, the open circuit voltage (V2b) of the second cell 21 rises beyond the initial state (V2a). Moreover, the mixed voltage (V3b) is higher than the initial state (V3a), since the open circuit voltage (V2b) of the second cell 21 is higher than the initial state (V2a).

In this case, it is unclear whether the second cell 21 has degraded, in a system in which the SOC of the first cell unit 10 is estimated through fitting to SOC-V3 in the initial state, on the basis of the detected mixed voltage (V3b). Accordingly, the SOC of the first cell unit 10 is estimated as usual through fitting to SOC-V3 (V3a) in the initial state, on the basis of the detected mixed voltage (V3b). The SOC of the first cell unit 10 is estimated as high when estimated through fitting to SOC-V3 (V3a) in the initial state on the basis of the detected mixed voltage (V3b).

When the SOC of the first cell unit 10 is estimated as high, charging of the first cell unit 10 is stopped even if there is a sufficient margin in the capacity of the first cell unit 10, in a system in which charging of the first cell unit 10 is stopped when the first cell unit 10 reaches a SOC established beforehand. As a result, charging of the first cell unit 10 is likely to be insufficient, and the first cell unit 10 may in some instances fail to be fully utilized, within an available SOC range. It is therefore preferable to replace the second cell 21 at an appropriate timing.

Trends in Case of Degradation of the First Cell Unit 10 (First Cells 11)

In the case of degradation of the first cell unit 10 (first cells 11), the mixed voltage (V3d) is detected as lower than that in the initial state (V3a) as illustrated in FIG. 7.

In this case, it is unclear whether the first cells 11 have degraded in a system in which the SOC of the first cell unit 10 is estimated through fitting to SOC-V3 in the initial state, on the basis of the detected mixed voltage (V3d). Accordingly, the SOC of the first cell unit 10 is estimated as usual through fitting to SOC-V3 (V3a) in the initial state, on the basis of the detected mixed voltage (V3d). The SOC of the first cell unit 10 is estimated as low when estimated through fitting to SOC-V3 (V3a) in the initial state on the basis of the detected mixed voltage (V3d).

When the SOC of the first cell unit 10 is estimated as low, charging of the first cell unit 10 is continued beyond a SOC established beforehand in the system in which charging of the first cell unit 10 is stopped when the first cell unit 10 reaches a SOC established beforehand. Accordingly, the estimated SOC of the first cell unit 10 becomes higher to some extent. In this case as well the mixed voltage (V3d) rises sharply when the SOC of the first cell unit 10 (first cells 11) reaches about SOC 95%. Thus, charging of the first cell unit 10 (first cells 11) is stopped before the SOC of the first cell unit 10 reaches SOC 100%. Overcharge of the first cell unit 10 can be prevented as a result.

Second Cell Degradation Detection Unit 50

Figure 8:
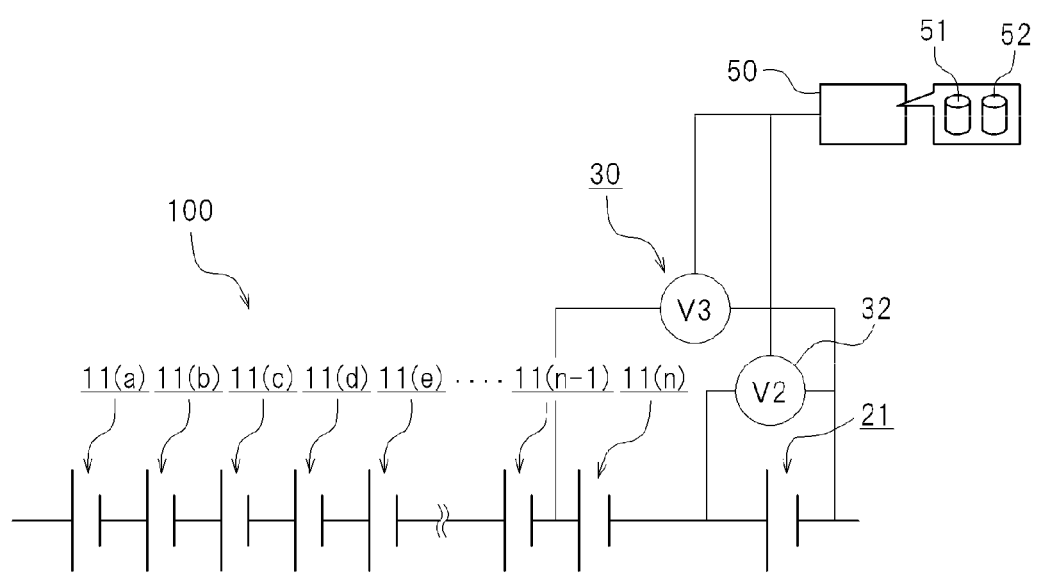
FIG. 8 illustrates another form of a cell system.

FIG. 8 illustrates another form of the cell system 100. As illustrated in FIG. 8, the cell system 100 may comprise a second cell degradation detection unit 50 that detects the degradation of the second cell 21. The appropriate timing of the replacement of the second cell 21 can be detected by providing thus the second cell degradation detection unit 50 that detects degradation of the second cell 21.

In the form illustrated in FIG. 8, the cell system 100 is provided with the second voltage detection unit 32 that detects the open circuit voltage (V2) of the second cell 21.

The second cell degradation detection unit 50 may be provided with a second map 51 (V3i-V2i) and a determination unit 52. For instance, the second map 51 (V3i-V2i) has stored therein beforehand a correlation relationship, serving as a reference, between the mixed voltage (V3) and the open circuit voltage of the second cell 21, as given in Table 1. Table 1 sets out reference values (V3i) of mixed voltage with respect to the state of charge (SOC) of the cell and reference open circuit voltages (V2i) for the second cell 21, in test performed beforehand. The second map 51 (V3i-V2i) is not limited thereto. Although not illustrated in the figures, for instance the relationship between the reference values (V3i) of the mixed voltage (V3) with respect to the state of charge (SOC) of the cell and the reference open circuit voltages (V2i) of the second cell 21 may be represented in the form of a graph.

TABLE 1

| SOC (%) | V3i | V2i |
|---|---|---|
| 100 | 9.100 | 4.100 |
| 99 | 8.897 | 4.082 |
| 98 | 8.828 | 4.066 |
| 97 | 8.779 | 4.052 |
| 96 | 8.741 | 4.038 |
| 95 | 8.710 | 4.025 |
| 94 | 8.685 | 4.012 |
| 93 | 8.664 | 4.001 |
| 92 | 8.645 | 3.989 |
| 91 | 8.629 | 3.978 |
| 90 | 8.615 | 3.968 |
| 89 | 8.601 | 3.958 |
| 88 | 8.588 | 3.948 |
| . | . | . |
| . | . | . |
| . | . | . |

Figure 9:
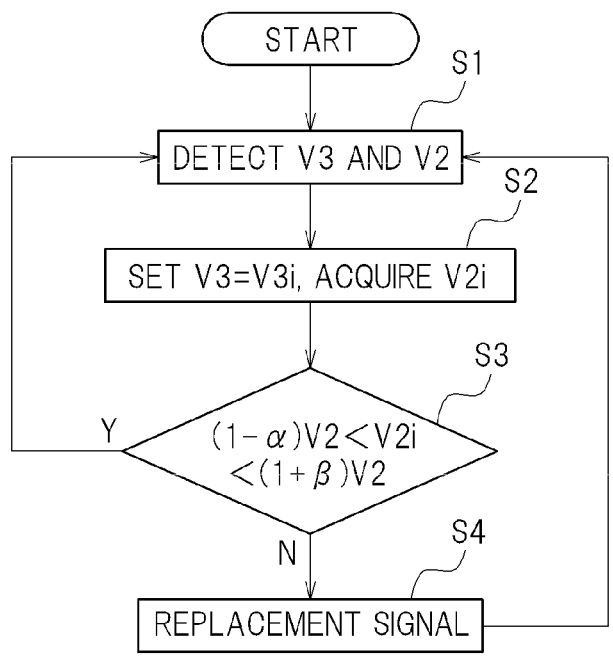
FIG. 9 is a flowchart illustrating a procedure for detecting degradation of a second cell.

In the present embodiment, the determination unit 52 determines whether the open circuit voltage (V2) of the second cell 21, as detected by the second voltage detection unit 32, lies within a range established beforehand with respect to the reference open circuit voltage (V2i) of the second cell 21. A procedure for detecting the degradation (replacement timing) of the second cell 21 using the determination unit 52 will be explained next. FIG. 9 is a flowchart illustrating the procedure for detecting the degradation (replacement timing) of the second cell 21.

Step 1: The mixed voltage (V3) and the open circuit voltage (V2) of the second cell 21 are detected, at a same timing, by the mixed voltage detection device 30 and the second voltage detection unit 32 (S1).

Step 2: The detected mixed voltage (V3) is fitted to the second map 51 (V3$i$-V2$i$) (herein, Table 1), by the mixed voltage detection device 30, and the reference open circuit voltage (V2$i$) of the corresponding second cell 21 referenced on the basis of the reference value (V3$i$) of the corresponding mixed voltage (S2). That is, a corresponding reference open circuit voltage (V2$i$) is obtained with V3=(V3$i$) through fitting to Table 1.

Step 3: it is determined whether or not the open circuit voltage (V2) of the second cell 21 as detected by the second voltage detection unit 32, at the same timing as the mixed voltage V3, lies within a range established beforehand with respect to the reference open circuit voltage (V2$i$) (S3). In a case where the range established beforehand with respect to the reference open circuit voltage (V2$i$) is set for instance to $(1-\alpha)$V2<V2$i$<$(1+\beta)$V2, then no replacement is necessary (Y) if V2 lies within such a range, and steps 1 to 3 are repeated. If V2 does not lie within the range (N), it may be determined that replacement is necessary.

In the determination of step 3, Expression $(1-\alpha)$V2<V2$i$<$(1+\beta)$V2 is an expression for determining whether or not the open circuit voltage (V2) of the second cell 21 as detected by the second voltage detection unit 32 lies within a range established beforehand with respect to the reference open circuit voltage (V2$i$). Herein, $\alpha$ prescribes a lower limit of the detected open circuit voltage (V2) with respect to the reference open circuit voltage (V2$i$) and $\beta$ prescribes an upper limit of the detected open circuit voltage (V2) with respect to the reference open circuit voltage (V2$i$). Different numerical values may be prescribed herein for $\alpha$ and $\beta$. The determination expression of step 3 is not limited to the expression above.

Step 4: in a case where replacement of the second cell 21 has been determined as necessary in step 3, there may be set for instance a flag denoting detection of degradation (herein, replacement timing) of the second cell 21 (S4). For instance, the system may be configured in such a manner that there is generated a signal denoting the replacement timing of the second cell 21. The second cell 21 can be replaced as a result at an appropriate timing. In the present embodiment, steps 1 through 4 are repeated in a state where a signal denoting the replacement timing of the second cell 21 has been generated in step 4.

Other Forms of the Second Cell Degradation Detection Unit 50

An explanation follows next on another form of the cell system 100 provided with the second cell degradation detection unit 50 that detects degradation of the second cell 21. The explanation will be made with reference to FIG. 1.

The second cell degradation detection unit 50 is provided with a determination unit 52 that determines a replacement timing of the second cell 21 on the basis of a rate of change ($\Delta$V3/$\Delta$SOC) in a relationship between the mixed voltage (V3) detected by the mixed voltage detection device 30 and the SOC of the first cell unit 10. In this case, the cell system 100 may be provided with the mixed voltage detection device 30, as illustrated in FIG. 1.

Figure 10:
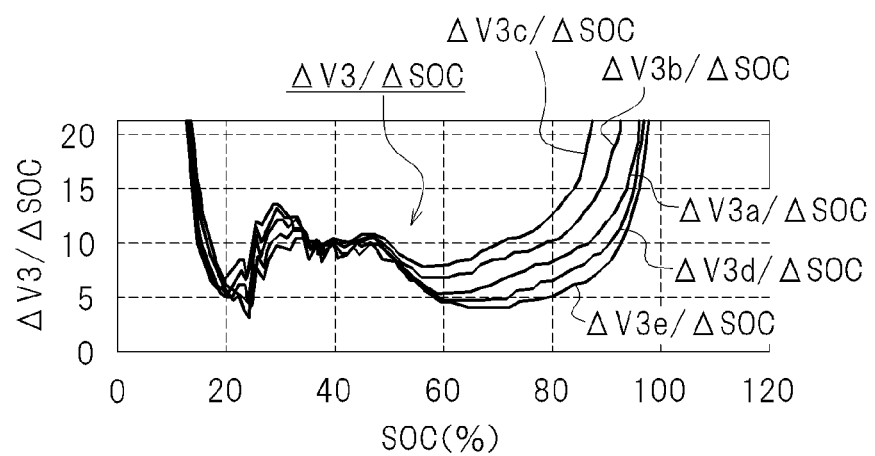
FIG. 10 illustrates a relationship between the SOC of a first cell unit 10 and ($\Delta$V3/$\Delta$SOC)

After the first cell unit 10 had been sufficiently discharged, the inventors charged the first cell unit 10 little by little, for instance through constant current charging. The quantity of electricity Q with which the first cell unit 10 was charged and the mixed voltage (V3) were obtained every time that the first cell unit 10 was charged a little. The relative value (SOC (%)) with respect to quantity of electricity at SOC 100% is obtained from the quantity of electricity Q with which the first cell unit 10 is charged. FIG. 10 illustrates a relationship between the SOC of the first cell unit 10 and ($\Delta$V3/$\Delta$SOC). Herein, ($\Delta$V3/$\Delta$SOC) is a value resulting from dividing the variation $\Delta$V3 of the mixed voltage (V3) by the amount of change $\Delta$SOC of the SOC of the first cell unit 10.

The value ($\Delta$V3/$\Delta$SOC) illustrated in FIG. 10 corresponds to a graph obtained by differentiating V3$a$ to V3$e$ of FIG. 7. That is, ($\Delta$V3$a$/$\Delta$SOC) corresponds to a value obtained by differentiating the detected SOC-mixed voltage (V3$a$) in the case of a combination of the first cell unit 10 (first cells 11) and the second cell 21, both in the initial state.

Further, ($\Delta$V3$b$/$\Delta$SOC) corresponds to a value obtained by differentiating the detected SOC-mixed voltage (V3$b$) in the case of a combination of the first cell unit 10 (first cells 11) in the initial state and the second cell 21 having degraded. Next, ($\Delta$V3$c$/$\Delta$SOC) corresponds to a value obtained by differentiating a detected SOC-mixed voltage (V3$c$) in the case of a combination of the first cell unit 10 (first cells 11) in the initial state and the second cell 21 having degraded further.

Next, ($\Delta$V3$d$/$\Delta$SOC) is a value obtained by differentiating the detected SOC-mixed voltage (V3$d$) in the case of a combination of the first cell unit 10 (first cells 11) having degraded and the second cell 21 in the initial state. Next, ($\Delta$V3$e$/$\Delta$SOC) corresponds to a value obtained by differentiating the detected SOC-mixed voltage (V3$e$) in the case of a combination of the first cell unit 10 (first cells 11) having degraded further and the second cell 21 in the initial state.

As a result, the influence of degradation of the first cell unit 10 or degradation of the second cell 21 translates into a large divergence of $\Delta$V3/$\Delta$SOC with respect to initial state ($\Delta$V3$a$/$\Delta$SOC), for a range of the SOC of the first cell unit 10 from about 70% to 85%, as illustrated in FIG. 10. The divergence of $\Delta$V3/$\Delta$SOC is large when the SOC of the first cell unit 10 is for instance about 80%.

In a case where, for instance, the first cell unit 10 has not degraded but the second cell 21 has, $\Delta$V3$b$/$\Delta$SOC tends to be larger than initial state $\Delta$V3$a$/$\Delta$SOC in a range of the SOC of the first cell unit 10 from about 70% to 85%. As the extent of degradation of the second cell 21 grows, $\Delta$V3$c$/$\Delta$SOC becomes yet larger than initial state $\Delta$V3$a$/$\Delta$SOC, in a range of the SOC of the first cell unit 10 from about 70% to 85%.

Therefore, the replacement timing of the second cell 21 may be detected on the basis of $\Delta$V3/$\Delta$SOC for a SOC of the first cell unit 10 in a range of about 70% to 85% (for instance, 80%).

In the present embodiment, the determination unit 52 determines the degradation (replacement timing) of the second cell 21 on the basis of $\Delta$V3/$\Delta$SOC (@SOC 80%) of the SOC (for instance, 80%) of the first cell unit 10 established beforehand.

Figure 11:
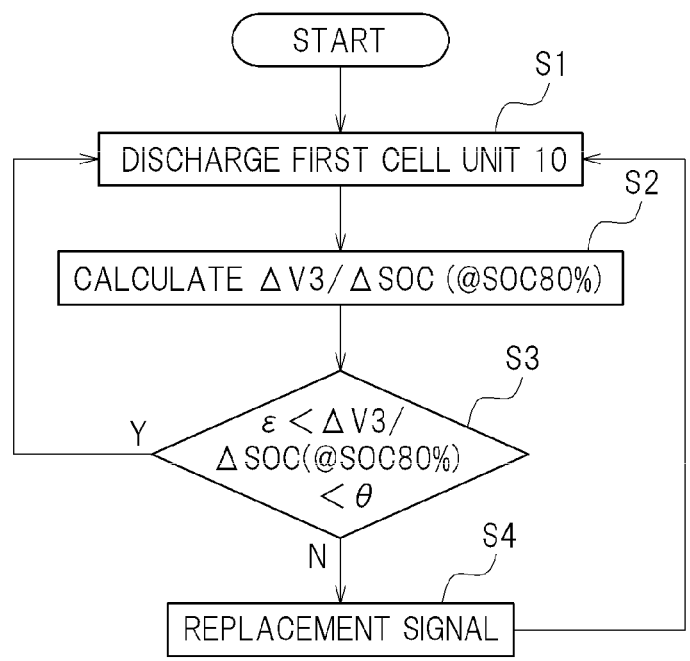
FIG. 11 is a flowchart illustrating a procedure for detecting degradation of a second cell.

A procedure for detecting the degradation of the second cell 21 (replacement timing) using the determination unit 52 will be explained next. FIG. 11 is a flowchart illustrating the procedure for detecting the degradation (replacement timing) of the second cell 21 in such an embodiment.

Step 1: the first cell unit 10 is sufficiently discharged (S1). For instance, the first cell unit 10 is discharged down to about SOC 50%.

Step 2: the first cell unit 10 is charged little by little, with the mixed voltage (V3) and the charged quantity of electricity Q being acquired each time, and ΔV3/ΔSOC (@SOC 80%) at a SOC established beforehand (for instance SOC 80%) is calculated (S2).

Step 3: it is determined whether ΔV3/ΔSOC (@SOC 80%) calculated in step 2 lies or not within a range established beforehand (S3). For instance, whether or not ΔV3/ΔSOC (@SOC 80%) lies within a range established beforehand may be determined through fitting to a determination expression ε<ΔV3/ΔSOC (@SOC 80%)<θ. If ΔV3/ΔSOC (@SOC 80%) lies within such a range (Y), a determination process of deeming replacement unnecessary is carried out. If V2 does not lie within the range (N), a determination process of deeming replacement necessary is carried out. Steps 1 through 3 are repeated after the above determinations.

In the determination of step 3, different numerical values may be prescribed for the upper limit ε and the lower limit θ in the determination expression ε<ΔV3/ΔSOC (@SOC 80%)<θ. The determination expression of step 3 is not limited to the expression above. Herein, ΔV3/ΔSOC used in this determination is not limited to SOC 80%.

Step 4: in a case where replacement of the second cell 21 has been determined as necessary (N) in step 3, there may be set for instance a flag denoting detection of degradation (herein, replacement timing) of the second cell 21 (S4). For instance, the system may be configured in such a manner that there is generated a signal denoting the replacement timing of the second cell 21. The second cell 21 can be replaced as a result at an appropriate timing. In the present embodiment, steps 1 through 4 are repeated in a state where a signal denoting the replacement timing of the second cell 21 has been generated in step 4.

In the cell system 100, a simple second cell unit 20 (for instance, unit cell (second cell 21)) may be electrically connected in series to the first cell unit 10 (battery pack) that constitutes a main power source. The state of charge (SOC) of the first cell unit 10 may be detected on the basis of the mixed voltage (V3) of the first cells 11 included in the first cell unit 10 and the second cell 21. The cell system 100 can thus detect properly the state of charge (SOC) of the first cell unit 10. Accordingly, the cell system 100 can be built into for instance a plug-in hybrid car, or a power source device for an electric car driving mode (EV mode).

Figure 12:
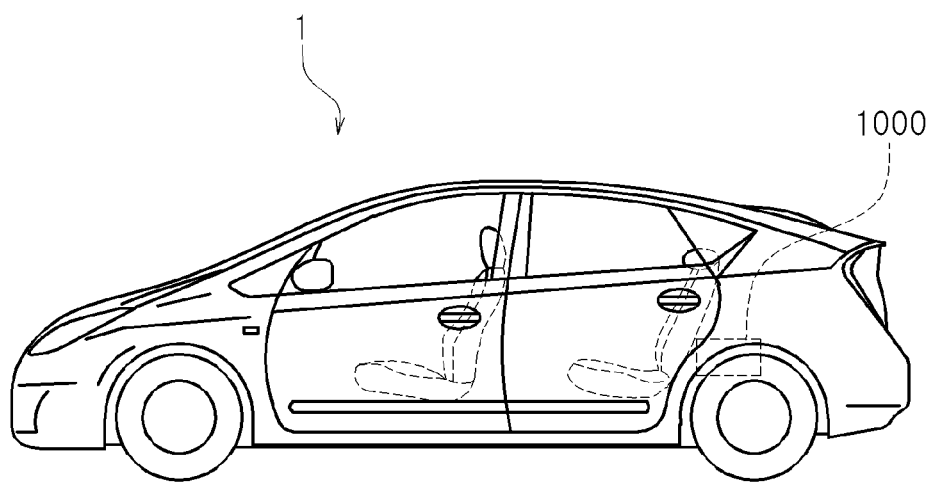
FIG. 12 is a diagram illustrating a vehicle equipped with a lithium ion battery (battery pack).

FIG. 12 is a diagram illustrating a vehicle 1 equipped with a lithium ion battery (battery pack 1000). In a plug-in hybrid car having a function of charging from an external power source, for instance a control device appropriately prompts switching between an electric car driving mode (EV mode) in which only the output obtained from a battery pack is used as a driving source, and a hybrid car driving mode (HV mode) in which the output obtained from a reciprocating engine is combined into the driving source. In a case where in such an application a control device (not shown) is assembled in such a way so as to prompt switching between the EV mode and the HV mode, on the basis of the estimated SOC of the battery pack 1000, high fuel efficiency may in some instances fail to be realized in that the driving mode is changed over to HV mode even though there may be actually sufficient margin in the capacity of the battery pack 1000, or to EV mode even though there may be actually no margin in the capacity of the battery pack 1000. Accordingly, the battery pack 1000 should preferably be prevented from overcharging.

For instance, high output is obtained, in a state of high SOC (state of charge), in large-scale cell systems (for instance, power source systems in hybrid cars or electric cars) in which the battery pack 1000 is used, but output tends to be low when SOC is low. Some applications require obtaining high output stably. The SOC of the battery pack 1000 is estimated accurately and is adjusted, to achieve high output stably, through control of charging and discharge by the control device in such a manner that battery pack 1000 is used mainly within a range of SOC set beforehand.

The cell system 100 described above allows estimating more accurately the SOC of the first cell unit 10 (battery pack), and charging the first cell unit 10 (battery pack) up to the upper limit of available SOC, while preventing the first cell unit 10 from overcharging. The performance of the first cell unit 10 can be fully brought out as a result. Therefore, the cell system 100 described above is suitably used in a large-scale cell system (for instance, a power source system in hybrid cars, electric cars and the like) using a battery pack, as illustrated in FIG. 12.

REFERENCE SIGNS LIST 1 vehicle
10 first cell unit
11 first cells
15 restraining member
20 second cell unit
21 second cell
30 mixed voltage detection device
31 first voltage detection unit
32 second voltage detection unit
40 capacity estimation device
41 first map
42 computing unit
50 cell degradation detection unit
51 second map
52 second cell determination unit
100 cell system
1000 battery pack
V1 open circuit voltage of first cell
V2 open circuit voltage of second cell
V3 mixed voltage

The invention claimed is:
1. A cell system, comprising:
a chargeable and dischargeable first cell unit;
a chargeable and dischargeable second cell unit; and
a mixed voltage detection device, wherein
the first cell unit includes a plurality of first cells connected in series;
the second cell unit includes at least a second cell connected in series to the first cell unit;
in the second cell, a change in open circuit voltage with respect to SOC (%), in a range from SOC 20% to SOC 80%, is larger than that in the first cell; and
the mixed voltage detection device is configured to:
obtain an open circuit voltage of one of the first cells included in the first cell unit,
obtain an open circuit voltage of the second cell included in the second cell unit, and
calculate a mixed voltage based on a sum of the open circuit voltage of the one of the first cells included in the first cell unit, and the open circuit voltage of the second cell included in the second cell unit.

2. The cell system according to claim 1, wherein in the first cells, a proportion of the change in open circuit voltage with respect to SOC (%), in the range from SOC 20% to SOC 80%, is 10 mV/10% or lower.

3. The cell system according to claim 1, wherein in the second cell, a proportion of the change in open circuit voltage with respect to SOC (%), in the range from SOC 20% to SOC 80%, is 50 mV/10% or higher.

4. The cell system according to claim 1,
wherein in the first cells, a proportion of the change of open circuit voltage with respect to SOC (%), within a range higher than SOC 95%, is 100 mV/10% or higher.

5. The cell system according to claim 1, further comprising a capacity estimation device that works out an estimated value of capacity of the first cells or the first cell unit on the basis of the mixed voltage detected by the mixed voltage detection device.

6. The cell system according to claim 5, wherein the capacity estimation device comprises:
a first map in which a correlation relationship, serving as a reference, between the mixed voltage and the capacity of the first cells or the first cell unit is stored beforehand; and
a computing unit that works out an estimated value of the capacity of the first cells or the first cell unit on the basis of the mixed voltage detected by the mixed voltage detection device and the first map.

7. The cell system according to claim 1, wherein the mixed voltage detection device is further configured to
detect a mixed voltage resulting from combining the open circuit voltage of a cell in which degradation has progressed most, from among the first cells included in the first cell unit, and the open circuit voltage of at least one second cell from among second cells included in the second cell unit.

8. The cell system according to claim 1, wherein the mixed voltage detection device is further configured to
detect a mixed voltage resulting from adding the open circuit voltage of the cell of highest open circuit voltage, from among the first cells included in the first cell unit, and the open circuit voltage of at least one second cell from among second cells included in the second cell unit.

9. The cell system according to claim 8, further comprising a first voltage detection unit that detects respective open circuit voltages of the plurality of first cells included in the first cell unit and provides the detected respective open circuit voltages to the mixed voltage detection device.

10. The cell system according to claim 9, wherein the mixed voltage detection device is further configured to
identify a cell of highest open circuit voltage from among the first cells included in the first cell unit, on the basis of the respective open circuit voltages of the plurality of first cells included in the first cell unit which have been detected by the first voltage detection unit.

11. The cell system according to claim 1, wherein the first cell unit comprises a restraining member that restrains the first cells included in the first cell unit; and
the second cell is structurally independent from the restraint of the restraining member that restrains the first cells, so as to be removable from the cell system without releasing the restraint of the restraining member that restrains the first cells.

12. The cell system according to claim 1, further comprising a second cell degradation detection unit configured to detect degradation of the second cell.

13. The cell system according to claim 12, further comprising:
a second voltage detection unit configured to detect the open circuit voltage of the second cell and provide the detected open circuit voltage- of the second cell to the mixed voltage detection device, wherein the second cell degradation detection unit comprises:
a second map ($V3i$-$V2i$) in which a correlation relationship, serving as a reference, between the mixed voltage and the open circuit voltage of the second cell is stored beforehand; and
a determination unit which, on the basis of a mixed voltage ($V3$) detected by the mixed voltage detection device and the second map ($V3i$-$V2i$), works out a reference open circuit voltage ($V2i$) of the second cell serving as a reference, and determines whether the open circuit voltage ($V2$) of the second cell detected by the second voltage detection unit lies within a range established beforehand with reference to the reference open circuit voltage ($V2i$) of the second cell.

14. The cell system according to claim 12, wherein the second cell degradation detection unit comprises
a determination unit that determines the extent of degradation of the second cell on the basis of a rate of change ($\Delta V3/\Delta SOC$) in a relationship between the mixed voltage ($V3$) detected by the mixed voltage detection device and the SOC of the first cell unit.

15. The cell system according to claim 1, wherein the first cells are lithium ion secondary batteries in which positive electrode active material particles having an olivine structure or spinel structure are used as a positive electrode active material, and the second cell is a lithium ion secondary battery in which positive electrode active material particles having a layered rock salt structure are used as a positive electrode active material.

16. A cell system, comprising:
a chargeable and dischargeable first cell unit;
a chargeable and dischargeable second cell unit; and
a mixed voltage detection device, wherein
the first cell unit includes a plurality of first cells connected in series;
the second cell unit includes at least a second cell connected in series to the first cell unit;
in the second cell, a change in open circuit voltage with respect to SOC (%), in a range from SOC 20% to SOC 80%, is larger than that in the first cell; and
the mixed voltage detection device is configured to:
obtain an open circuit voltage of at least one first cell from among the first cells included in the first cell unit,
obtain an open circuit voltage of at least one second cell from among the second cells included in the second cell unit, and
calculate a mixed voltage based on a sum of the open circuit voltage of at least one first cell from among the first cells included in the first cell unit, and the open circuit voltage of at least one second cell from among the second cells included in the second cell unit; and wherein
the first cell unit comprises a restraining member that restrains the first cells included in the first cell unit; and
the second cell is structurally independent from the restraint of the restraining member that restrains the first cells, so as to be removed from the cell system without releasing the restraint of the restraining member that restrains the first cells.

17. A cell system, comprising:
a chargeable and dischargeable first cell unit;
a chargeable and dischargeable second cell unit; and
a mixed voltage detection device, wherein
the first cell unit includes a plurality of first cells connected in series;
the second cell unit includes at least a second cell connected in series to the first cell unit;

in the second cell, a change in open circuit voltage with respect to SOC (%), in a range from SOC 20% to SOC 80%, is larger than that in the first cell; and the mixed voltage detection device is configured to:

obtain an open circuit voltage of at least one first cell from among the first cells included in the first cell unit, obtain an open circuit voltage of at least one second cell from among the second cells included in the second cell unit, and calculate a mixed voltage based on a sum of the open circuit voltage of at least one first cell from among the first cells included in the first cell unit, and the open circuit voltage of at least one second cell from among the second cells included in the second cell unit; and wherein the first cells are lithium ion secondary batteries in which positive electrode active material particles having an olivine structure or spinel structure are used as a positive electrode active material, and the second cell is a lithium ion secondary battery in which positive electrode active material particles having a layered rock salt structure are used as a positive electrode active material.

\* \* \* \* \*